US010810640B1

(12) United States Patent
Cheung et al.

(10) Patent No.: US 10,810,640 B1
(45) Date of Patent: Oct. 20, 2020

(54) AUTOMATED TIME TRACKING OF EVENTS IN A CALENDAR AND USE OF THE SAME TO GENERATE INVOICES

(71) Applicants: Owen Pingchi Cheung, Hillsborough, CA (US); Mary Elizabeth Kroenung, Mountain View, CA (US); Rongfei Geng, San Jose, CA (US); Peter Allen Vogel, Santa Clara, CA (US); Katja Nicola Spreckelmeyer, Palo Alto, CA (US)

(72) Inventors: Owen Pingchi Cheung, Hillsborough, CA (US); Mary Elizabeth Kroenung, Mountain View, CA (US); Rongfei Geng, San Jose, CA (US); Peter Allen Vogel, Santa Clara, CA (US); Katja Nicola Spreckelmeyer, Palo Alto, CA (US)

(73) Assignee: Intuit Inc., Mountain View, CA (US)

(*) Notice: Subject to any disclaimer, the term of this patent is extended or adjusted under 35 U.S.C. 154(b) by 772 days.

(21) Appl. No.: 15/418,673

(22) Filed: Jan. 27, 2017

(51) Int. Cl.
   *G06Q 30/04* (2012.01)
   *G06Q 10/10* (2012.01)
   *G06Q 40/06* (2012.01)

(52) U.S. Cl.
   CPC ......... *G06Q 30/04* (2013.01); *G06Q 10/1095* (2013.01); *G06Q 10/1097* (2013.01); *G06Q 40/06* (2013.01)

(58) Field of Classification Search
   None
   See application file for complete search history.

(56) References Cited

U.S. PATENT DOCUMENTS

| | | | | |
|---|---|---|---|---|
| 9,483,797 | B1* | 11/2016 | Hebard | G06Q 40/12 |
| 9,978,097 | B1* | 5/2018 | Melling | G06Q 40/00 |
| 2001/0032170 | A1* | 10/2001 | Sheth | G06Q 10/0631 705/37 |
| 2002/0035593 | A1* | 3/2002 | Salim | G06Q 10/10 709/202 |
| 2005/0246274 | A1* | 11/2005 | Abbott | G06Q 20/102 705/40 |
| 2006/0064313 | A1* | 3/2006 | Steinbarth | G06Q 40/08 705/322 |
| 2007/0214068 | A1* | 9/2007 | Tadepalli | G06Q 30/04 705/34 |
| 2010/0211486 | A1* | 8/2010 | Abrashkin | G06Q 10/00 705/32 |
| 2011/0270748 | A1* | 11/2011 | Graham, III | G06Q 20/102 705/40 |

(Continued)

*Primary Examiner* — Thomas L Mansfield
(74) *Attorney, Agent, or Firm* — Ferguson Braswell Fraser Kubasta PC

(57) ABSTRACT

A method for the automated time tracking of events in a calendar and the use of the same to generate invoices, which includes detecting an event record creation request received from a user, monitoring, based on the event record creation request, user input including event details for an event record, identifying a control character within the user input, while monitoring the user input, populating, in response to identifying the control character, a list comprising one or more contacts from a contact group of the user, displaying, to the user, the list of the one or more contacts, receiving a selection of a contact from within the list, and inserting an identifier of the contact within the event record, based on the selection.

13 Claims, 11 Drawing Sheets

(56) References Cited

U.S. PATENT DOCUMENTS

| | | | | |
|---|---|---|---|---|
| 2012/0310826 | A1* | 12/2012 | Chatterjee | G06Q 20/322 |
| | | | | 705/41 |
| 2013/0144782 | A1* | 6/2013 | Eberle | G06Q 20/102 |
| | | | | 705/40 |
| 2014/0006236 | A1* | 1/2014 | Nitschke | G06Q 30/04 |
| | | | | 705/34 |
| 2014/0019352 | A1* | 1/2014 | Shrivastava | G06Q 20/36 |
| | | | | 705/41 |
| 2014/0188577 | A1* | 7/2014 | Gerber | G06Q 10/1091 |
| | | | | 705/7.42 |
| 2015/0011184 | A1* | 1/2015 | Sutaria | H04L 12/14 |
| | | | | 455/408 |
| 2015/0019661 | A1* | 1/2015 | Johnson | G06F 16/2282 |
| | | | | 709/206 |
| 2015/0120395 | A1* | 4/2015 | Bellini, III | G06Q 10/0637 |
| | | | | 705/7.36 |
| 2017/0169520 | A1* | 6/2017 | Cornet | G06Q 40/125 |

* cited by examiner

Invoice Customer ? ✕

Adam Szylangi ▾ 460

AdamSizzzle@aol.com

Billing Address
Adam Szylangi
Innovate LLC
46 Oak Street
San Francisco, CA

Terms  Invoice Date  Due Date
Net 30 ▾  11/30/2016 ▾  12/29/2016 ▾

| # | Product/Service | Description | Qty. | Rate | Amount |
|---|---|---|---|---|---|
|   |   |   |   |   |   |
|   |   |   |   |   |   |
|   |   |   |   |   |   |

Add to Invoice

Billable time
11/22/2016
2 hours
$440.00
Client Meeting with
+Adam Szylangi
[ Add to Invoice ]  ↙ 464

Billable time
11/09/2016
1 hours
$200.00
Planning Lunch with
+Adam Szylangi
[ Add to Invoice ]  ↙ 466

[ Add All ]  ↙ 468

[ Cancel ]  [ Clear ]          [ Save ]  [ Save and Send ]

AUTOMATED TIME TRACKING OF EVENTS IN A CALENDAR AND USE OF THE SAME TO GENERATE INVOICES

BACKGROUND

One or more people may be tasked to devote some portion of their time working on a given project. Often, those people will utilize a calendar to schedule meetings, and to reserve time in their day for working on the tasks they are expected to complete. However, the time spent at those meetings or working independently on such tasks is often billed using separate software functionality. For example, an invoice may be generated using a financial management application, such as an accounting application, that operates independently of the calendar tool. Consequently, the process of invoice creation and tracking is often a labor-intensive and time-intensive task that requires the dedication and cooperation of multiple parties to ensure that all calendared events are correctly copied and entered to the financial management application, and then properly billed from there.

SUMMARY

In general, in one aspect, the invention relates to a method for the automated time tracking of events in a calendar and the use of the same to generate invoices. The method comprises detecting an event record creation request received from a user. The method further comprises monitoring, based on the event record creation request, user input including event details for an event record. The method further comprises identifying a control character within the user input, while monitoring the user input. The method further comprises populating, in response to identifying the control character, a list comprising one or more contacts from a contact group of the user. The method further comprises displaying, to the user, the list of the one or more contacts. The method further comprises receiving a selection of a contact from within the list. The method further comprises inserting an identifier of the contact within the event record, based on the selection.

In general, in one aspect, the invention relates to a system for the automated time tracking of events in a calendar and the use of the same to generate invoices. The system comprises a browser extension interfacing with a browser application executing on a computer processor. The browser extension is configured to detect an event record creation request initiated within the browser application. The browser extension is further configured to monitor, based on the event record creation request, user input including event details for an event record. The browser extension is further configured to identify a control character within the user input, while monitoring the user input. The browser extension is further configured to populate, in response to identifying the control character, a list with one or more contacts from a contact group. The browser extension is further configured to display the list of the one or more contacts. The browser extension is further configured to receive a selection of a contact from within the list. The browser extension is further configured to insert an identifier of the contact within the event record, based on the selection.

In general, in one aspect, the invention relates to a non-transitory computer readable storage medium comprising instructions for performing the automated time tracking of events in a calendar and the use of the same to generate invoices. The instructions comprise detecting an event record creation request received from a user. The instructions further comprise monitoring, based on the event record creation request, user input including event details for an event record. The instructions further comprise identifying a control character within the user input, while monitoring the user input. The instructions further comprise populating, in response to identifying the control character, a list comprising one or more contacts from a contact group of the user. The instructions further comprise displaying, to the user, the list of the one or more contacts. The instructions further comprise receiving a selection of a contact from within the list. The instructions further comprise inserting an identifier of the contact within the event record, based on the selection.

Other aspects of the invention will be apparent from the following description and the appended claims.

BRIEF DESCRIPTION OF DRAWINGS

FIGS. 4A, 4B, and 4C show examples of automated time tracking of events in a calendar, and use of the events to generate invoices, in accordance with one or more embodiments of the invention.

DETAILED DESCRIPTION

Figure 1A:
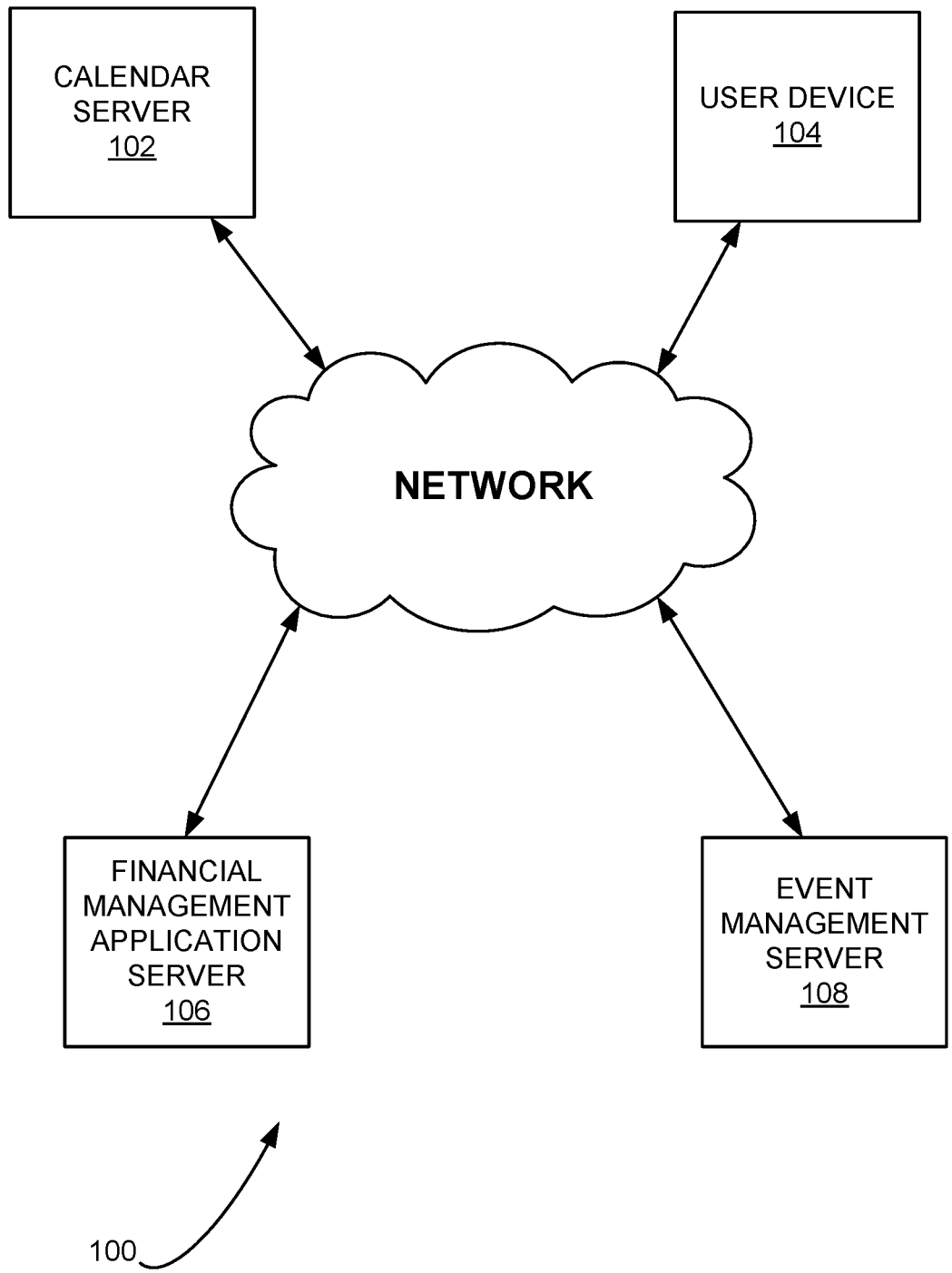
FIGS. 1A, 1B, 1C, and 1D show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The effective tracking and harvesting of billable time can be a difficult, error-prone, and time-consuming process. This process is further aggravated when a time-keeper relies on an electronic calendar to track or store some portion of their billable time. Often, such a calendar operates independently of the user's billing/invoicing software. As a result, neither the publisher of the calendar software nor the publisher of the billing software is able to offer a solution that effectively merges together the two functionalities. Further aggravating the problem, the two software tools may be upgraded independently, requiring a time-keeper to learn new methods of time-tracking and/or billing, as software interfaces and capabilities evolve over time. As a result, the tracking and harvesting of billable time often interferes with the more important customer-focused tasks that businesspersons feel are a better use of their energies.

Described herein are systems and methods for enabling the efficient excavation of billable time from a calendar maintained by a user, such as a consultant, salesperson, manager, designer, engineer, developer, etc. In particular, the systems and methods described herein recognize the occurrence of billable time activities within the events of user calendars. Furthermore, the systems and methods described herein utilize event details to identify a customer that should be invoiced for the time, as well as an amount for which the customer should be invoiced. As described herein, such automation may be facilitated using software resident on a user's device that is operative to monitor user input during the creation of calendar events. In particular, such software may operate to identify one or more specific control characters within user input during the creation of a calendared event, and, based on the control characters, identify a customer that should be billed for the event. In this way, a customer may be invoiced for billable time that is tracked within a calendar as soon as the event completes, without requiring supplementary efforts of the billing party. Moreover, through such automation, the user may continue to utilize their preferred calendaring software and preferred billing software, and trust that the invention described herein seamlessly integrates together the two independent pieces of software.

FIG. 1A depicts a schematic block diagram of a system (100) for the automated time tracking of events in a calendar, and for using the events to generate invoices, in accordance with one or more embodiments of the invention. In one or more embodiments of the invention, one or more of the elements shown in FIG. 1A may be omitted, repeated, and/or substituted. Accordingly, embodiments of the invention should not be considered limited to the specific arrangements of modules shown in FIG. 1A.

As shown in FIG. 1A, the system (100) includes a calendar server (102), a user device (104), a financial management application server (106), and an event management server (108). Each of the calendar server (102), the user device (104), the financial management application server (106), and the event management server (108) are communicatively coupled via a network. Accordingly, in one or more embodiments, each of the calendar server (102), the user device (104), the financial management application server (106), and the event management server (108) may comprise separate physical computing systems that communicate via one or more computer networks. As non-limiting examples, the computer network(s) may include wired and/or wireless portions of public and/or private data networks, such as wide area networks (WANs), local area networks (LANs), the Internet, etc. In one or more embodiments, one or more of the calendar server (102), the user device (104), the financial management application server (106), and the event management server (108) may reside on a single physical computing system. For example, two or more of the calendar server (102), the financial management application server (106), and the event management server (108) may comprise a single physical device.

As used herein, the financial management application server (106) includes computational hardware and software that executes processes for the performance of specific tasks of a financial management application utilized to manage some aspect of a business. The tasks may be performed by the financial management application server (106) on behalf of business entities, and in furtherance of organizational or commercial objectives of the business entities. For example, a financial management application hosted on the financial management application server (106) may be utilized by business entities to perform accounting or bookkeeping functions, run payroll, calculate tax liabilities, bill customers, create and send invoices, etc. A more specific, non-limiting example of such a financial management application hosted on the financial management application server (106) includes Intuit® QuickBooks Online.

The calendar server (102) includes computational hardware and software that executes processes for the performance of specific tasks related to calendar and contact management. Accordingly, the calendar server (102) may be used to schedule or track particular events for one or more users, such as, for example, trips, meetings, time spent performing tasks, completed tasks, etc. Also, the calendar server (102) may be used to store the contact information (e.g., phone numbers, email addresses, physical addresses, etc.) of contacts, such as, for example, family members, friends, business contacts, etc.

In one or more embodiments, the calendar server (102) may adhere to established standards/protocols for communicating contact data and/or event data. For example, the calendar server (102) may utilize WebDAV, CardDAV, CalDAV, iCalendar, etc. for enabling the access and sharing of event information and/or contact information. In one or more embodiments, the calendar server (102) may host a commercially available product, such as, for example, Google® Calendar, Microsoft® Exchange®, Apple® Calendar and Contacts Server, etc.

The user device (104) includes computational hardware and software for the performance of various business-related processes. In one or more embodiments, the user device (104) may include user input devices for receiving input from a user, such as a mouse, touchscreen, keyboard, etc., and may include a display device. For example, the user device (104) may include a desktop computer, portable computer (e.g., laptop, netbook, etc.), or mobile device (e.g., tablet computer, cellular phone, smartphone, etc.), etc. A display of the user device (104) may present a user interface to a user thereof. The user interface may enable the user to access a calendar hosted on the calendar server (102) and/or a financial management application hosted on the financial management application server (106). For example, the user device (104) may execute a web browser application for accessing a calendar accessible via HTTP at the calendar server (102). Accordingly, the user device (104) may display a web page or other application to a user that includes a calendar of the user. The calendar may include time the user has spent or will spend working on tasks, travelling for projects, meeting with clients, etc. Still further, a user interface to a financial management application hosted on the financial management application server (106) may be presented at the user device (104). Accordingly, using the user device (104), a user may generate invoices, record payments, etc., to a remote financial management application.

The event management server (108) includes computational hardware and software that controls the movement of information between the calendar server (102) and the financial management application server (106). As described below, the event management server (108) may automate the movement billable event records from the calendar server (102) to the financial management application server (106). In one or more embodiments, the event management server (108) may be pushed data from the calendar server (102) and/or financial management application server (106). For example, the event management server (108) may subscribe to the creation of events or contacts on the calendar server (102). As a result, whenever a contact or event residing on the calendar server (102) is created or modified, the event management server (108) is notified and/or receives the contents of the contact or event that was modified. In one or more embodiments, the event management server (108) may periodically poll the calendar server (102) for any newly created or modified contacts or events. For example, the event management server (108) may connect to the calendar server (102) every minute, 10 minutes, 15 minutes, etc., to determine whether any contacts or calendar events have been created or modified on the calendar server (102).

In one or more embodiments, event records may be forwarded from the event management server (108) to the financial management application server (106) after the occurrence of a specific condition. For example, the event management server (108) may forward the data for an event to the financial management application server (106) only after the event has completed. In this way, and as described below, the event management server (108) may control the movement of billable event records to the financial management application server (106) in a manner that ensures timely, accurate, and efficient billing.

Figure 1B:
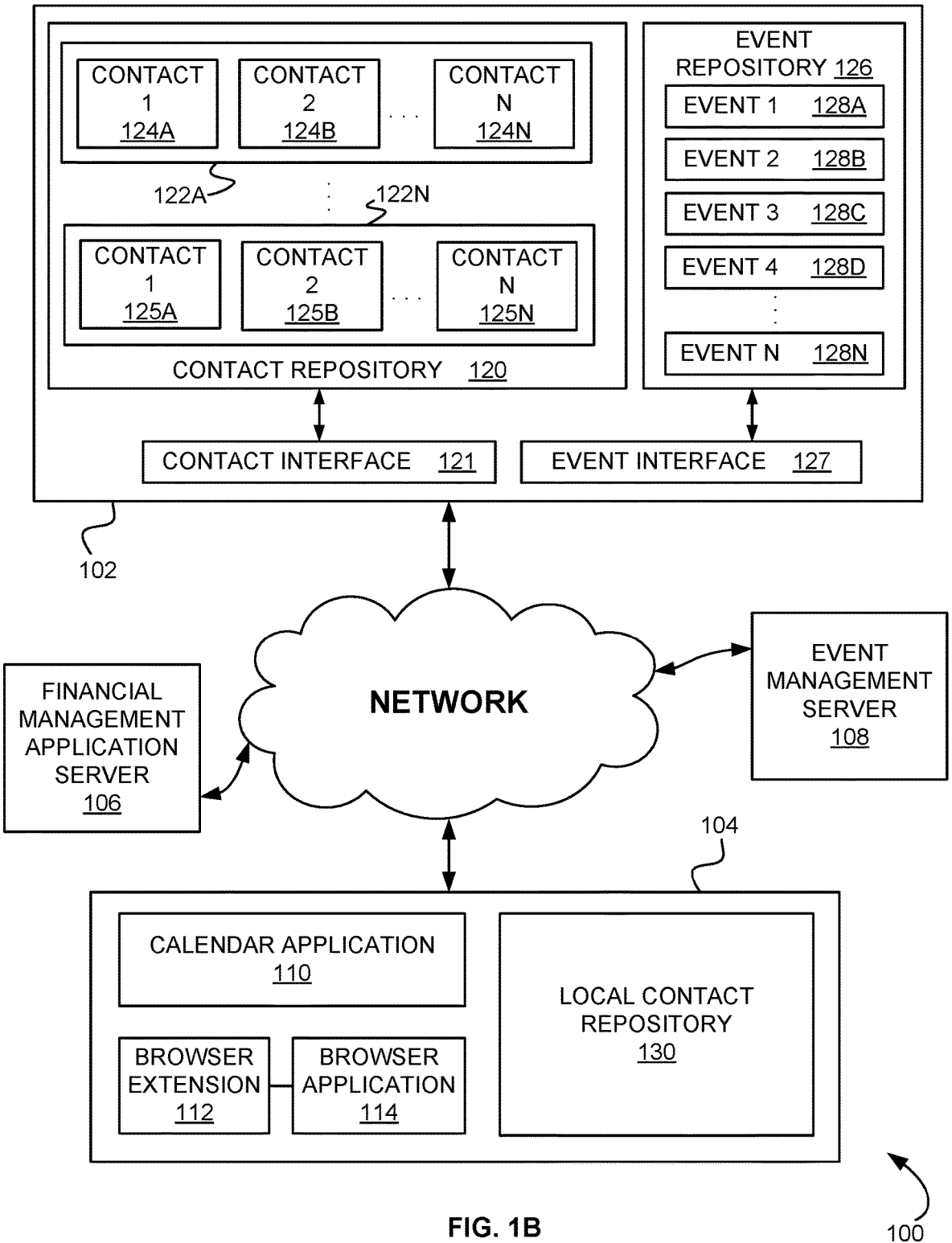

FIG. 1B depicts another view of the system (100) for the automated time tracking of events in a calendar, and for using the events to generate invoices, in accordance with one or more embodiments of the invention. In one or more embodiments of the invention, one or more of the elements shown in FIG. 1B may be omitted, repeated, and/or substituted. Accordingly, embodiments of the invention should not be considered limited to the specific arrangements of modules shown in FIG. 1B.

As depicted in FIG. 1B, the calendar server (102) includes a contact repository (120), an event repository (126), a contact interface (121), and an event interface (127). Also, as depicted in FIG. 1B, the client device (104) includes a calendar application (110), a browser application (114), a browser extension (112), and a local contact repository (130).

The calendar server (102) may store a contact repository (120) and an event repository (126) for each of a plurality of users. In other words, the contact repository (120) and event repository (126) depicted in FIG. 1B may include event records (128), contact records (124, 125), and contact groups (122) for a single user of the client device (104). For purposes of simplicity and clarity, only the single contact repository (120) and event repository (126) are shown, however it is understood that one or more additional contact repositories (not shown) and event repositories (not shown) may be maintained on the calendar server (102) on behalf of other users.

As described herein, the contact repository (120) stores various contact records (124, 125). In one or more embodiments, the contact records (124, 125) may be further divided into contact groups (122) for a given user or entity. For example, as shown in FIG. 1B, the contact repository (120) includes a plurality of contact groups (122A-122N) for a particular user or entity. Accordingly, a first contact group (122A) is shown to include a number of contacts records (124A-124N), and another contact group (122N) is shown to include yet another number of contact records (125A-125N).

A given contact record (124, 125) may include any relevant contact details of a particular contact. The contact details may include any combination of: a name, a company, an address, a phone number, an email address, a birthday, etc. For example, a first contact record (124A) may include the first name, mobile phone number, and home address of a first contact, and a second contact record (124B) may include the first name, last name, office phone number, fax number, email address, and office address of a second contact. Moreover, the first contact record (124A) and the second contact record (124B) are included in the same contact group (122A).

A contact group (122) comprises any grouping of contact records (124, 125) that may be considered associated for any reason. For example, the first contact group (122A) may include the contact records (124) for all business contacts of a given user, while the second contact group (122N) includes all the contact records (125) for the family members, friends, etc. of the user. The business contacts of the user may include any customers, employees, business partners, business leads, recruits, consultants, etc. with which the user interacts or intends to interact. In one or more embodiments, the creation and access of a specific contact group (122) may facilitate the transfer of billable event records to a financial management application, as described below.

As described herein, the event repository (126) stores various event records (128). In one or more embodiments, each of the event records (128) may include any relevant event details of a calendared event. A calendared event includes any discreet period of time that occurs in the past, present, or future. A calendared event may occur on one or more specific days, start at a specific time, and end at a specific time.

Accordingly, each of the event records (128) may be structured to store event details as values within one or more fields. For example, FIG. 1D depicts an optional configuration of the event records (128). As shown in FIG. 1D, each of the event records (128) may include a date (182), a start time (184), an end time or duration (186), a contact identifier (188), a billable value (190), and/or an account identifier or user identifier (192). Each of these values may be formatted in any feasible manner. For example, the date (182) may be formatted as 10/21/2016, May 21, 2016, 2016-05-21, etc. In one or more embodiments the contact identifier (188) may identify one or more contacts associated with a contact record (124, 125). For example, the contact identifier (188) may refer to a first contact record (124A) in the contact repository (120). More specifically, the contact identifier (188) may include a name of the contact in the first contact record (124A), an email address of the contact in the first contact record (124A), or other unique identifier of the contact in the first contact record (124A). In one or more embodiments, the billable value (190) may be any amount that the user or entity that created the event record (128) intends to charge in association with the event. The party being charged may be the contact identified by the contact identifier (188). The billable value (190) may be an hourly billable rate (e.g., $100/hour) or a flat fee or single charge (e.g., $100). Of course, it is understood that the billable value (190) may store a value for any type of currency (e.g., U.S. Dollars, Canadian Dollars, Euros, British Pounds, etc.). Finally, the account identifier or user identifier (192) may identify a user or account that created the event record (128). The account identifier or user identifier (192) may be matched with an account hosted on a financial management application, to facilitate account management and invoicing functions.

Referring again to FIG. 1B, each of the contact repository (120) and the event repository (126) may be any type of storage unit and/or device (e.g., a file system, database, collection of tables, etc.) for storing the contact records (124, 125), the contact groups (122), and/or the event records (128). Further, each of the contact repository (120) and the event repository (126) may include multiple different storage units and/or devices. The multiple different storage units and/or devices may or may not be of the same type or located at the same physical site.

Still referring to FIG. 1B, the contact interface (121) may include any application programming interface (API) that is operative to receive communications over the network for manipulating contact records (124, 125) and/or contact groups (122) in the contact repository (120). For example, the contact interface (121) may be used to create a contact group (122A), delete another contact group (122N), create a contact record (124B), modify the details of another contact record (124B), and delete yet another contact record (124N). Similarly, the event interface (127) may include any API that is operative to receive communications over the network for manipulating event records (128) in the event repository (126). For example, the event interface (127) may be used to create an event record (128A), delete another event record (128B), and/or modify the details of yet another event record (128C).

In one or more embodiments, the contact interface (121) and/or the event interface (127) may include web services APIs that are accessible over the network to processes executing on the client device (104). For example, the contact interface (121) and/or the event interface (127) may be accessible to a calendar application (110), browser application (114), browser extension (112), and/or local contact repository (130), each of which are shown to execute on the client device (104).

As used herein, the calendar application (110) includes any scheduling or calendaring application that is locally executed on the client device (104). Examples of common calendar applications (110) include Microsoft® Outlook® and Mozilla® Thunderbird®. The browser application (114) is configured to execute on one or more computer processors and includes any software application for retrieving, presenting, and/or navigating resources on the network. Examples of common browser applications (114) include Google® Chrome® and Mozilla® Firefox®. The browser extension (112) includes any software that extends the functionality of the browser application (114) in some manner. For example, the browser extension (112) may improve the accessibility or interface of the browser application (114) by adding non-native functionality.

Any of the calendar application (110), the browser application (114), and/or browser extension (112) may be used to view, create, and/or edit calendared events that are managed remotely from the user device (104). For example, the calendar application (110), the browser application (114), and/or browser extension (112) may be used to view, create, and/or edit event records (128) that are stored on the calendar server (102). Similarly, any of the calendar application (110), the browser application (114), and/or browser extension (112) may be used to view, create, and/or edit contact information that is managed remotely from the user device (104). For example, the calendar application (110), the browser application (114), and/or browser extension (112) may be used to view, create, and/or edit contact records (124, 125) and/or contact groups (122) that are stored on the calendar server (102). In this way, the calendar server (102) may provide an HTTP-accessible calendar, such as, for example, Google® Calendar; or may provide calendaring and contact information by way of proprietary remote procedure calls, such as, for example, Microsoft® Exchange®.

In one or more embodiments, the local contact repository (130) serves as a copy, or portion thereof, of the contact repository (120) on the calendar server (102). For example, the local contact repository (130) may include copies of all of the contact records (124A-124N, 125A-125N) for a given user, a limited selection of contact groups (122) (e.g., only a first contact group (122A)), or a limited selection of contact records (e.g., only a first contact record (125B) and second contact record (125N).

In one or more embodiments, the calendar application (110), the browser application (114), and/or browser extension (112) may monitor for the entry of a control character during the creation of an event record (128). In other words, the calendar application (110), the browser application (114), and/or browser extension (112) may monitor for a control character in user input while the user enters details for an event record (128). For example, the calendar application (110) may monitor for such a control character while a user of the client device (104) is entering event details within the calendar application (110). As another example, the browser (114) or the browser extension (112) may monitor for such a control character while a user of the client device (104) is entering event details within a web-based calendar that is hosted on the calendar server (102).

In one or more embodiments, the control character may be any suitable character or combination of characters. For example, the control character may be a '+', '#', or '@' character, or some combination thereof. As described in more detail below, in response to the identifying of a control character in user input, the calendar application (110), browser extension (112), and/or browser application (114) may populate a list of contacts from the contact repository (120) or the local contact repository (130), based on the records found therein. As an option, the list of contacts may originate from a single contact group (122). Moreover, the list may be presented to the user, to facilitate the selection of a pre-defined contact from the list. As described below, by way of selecting a contact in the list, the user may indicate that the user will be billed for the event. Accordingly, the user may also provide, within the user input, a billable value that is included in the event record being created.

In one or more embodiments, the calendar application (110), the browser application (114), and/or browser extension (112) may monitor for the entry of a second control character during the creation of an event record, or in the user input while entering details for the event record. The second control character may be a currency symbol that is used to denote a currency amount or value. For example, the second control character may be a dollar sign (e.g., '$'), a euro symbol (e.g., '€'), a pound sterling symbol (e.g., '£'), or any other suitable symbol, sign, or character. Again, for example, the calendar application (110) may monitor for such a currency symbol while a user of the client device (104) is entering event details within the calendar application (110). As another example, the browser (114) or the browser extension (112) may monitor for such a currency symbol while a user of the client device (104) is entering event details within a web-based calendar that is hosted on the calendar server (102). Thus, a billable value may be included in the event record being created when a currency symbol is identified within the user input used to create the event record.

In one or more embodiments, the browser extension (112) may identify that a user of the client device (104) is using a web-based calendar within the browser application (114), and provide such control character functionality to the user. For example, the browser extension (112) may identify that the user has initiated the creation of an event record within a web-based calendar hosted by the calendar server (102). Such an identification may be performed by recognizing a domain, an URL, etc. of the calendar server (102). Still yet, in response to identifying the creation of the event record, the browser extension (112) may then begin monitoring for a control character within user input. In response to such a control character, the browser extension (112) may populate the list of contacts for the user, and then present the list to the user within the browser application (114). The list may be populated by retrieving a set of contact records (124, 125) or a contact group (122) from the contact repository (120) and/or the local contact repository (130).

Figure 1C:
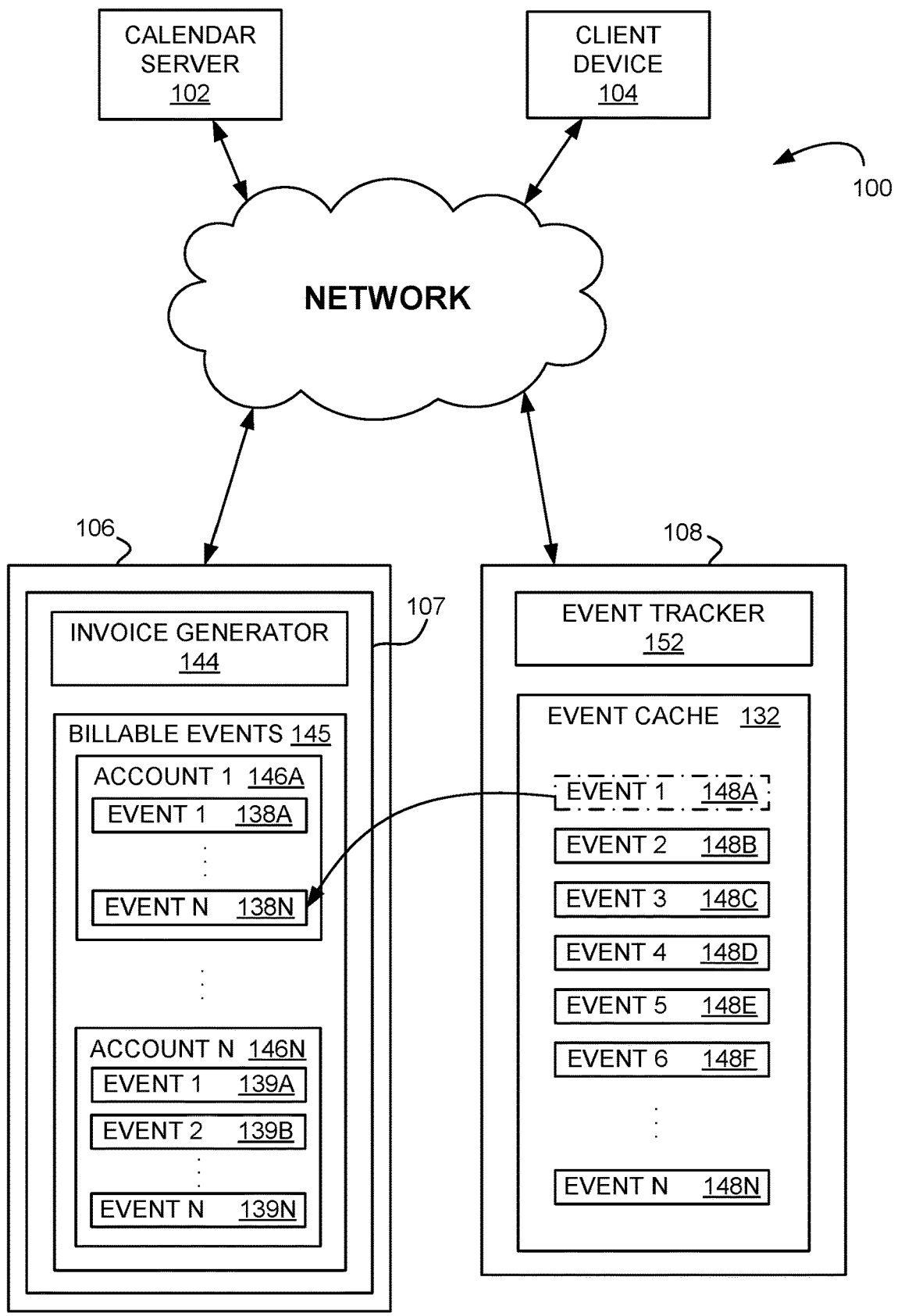
Figure 1D:
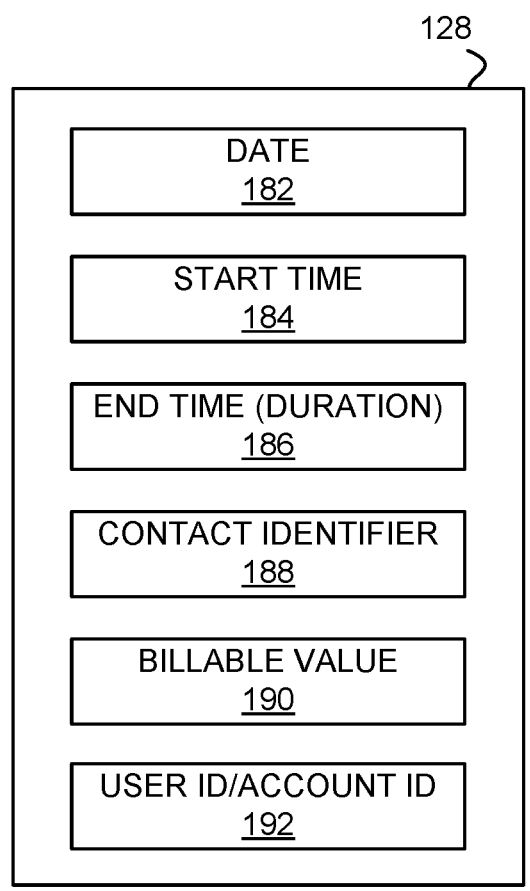

FIG. 1C depicts another view of the system (100) for the automated time tracking of events in a calendar, and for using the events to generate invoices, in accordance with one or more embodiments of the invention. In one or more embodiments of the invention, one or more of the elements shown in FIG. 1C may be omitted, repeated, and/or substituted. Accordingly, embodiments of the invention should not be considered limited to the specific arrangements of modules shown in FIG. 1C.

As shown in FIG. 1C, the event management server (108) is depicted to include an event tracker (152) and an event cache (132); and the financial management application server (106) is depicted to include a financial management application (107). The financial management application (107) includes an invoice generator (144) and a billable event repository (145). Also, as shown, the billable event repository (145) includes numerous event records (138, 139) for different accounts (146). The event cache (132) of the event management server (108) is illustrated to temporarily hold event records (148). Specifically depicted in FIG. 1C, the event cache (132) holds numerous event records (148A-148N), where each of the event records (148A-148N) is associated with a pending event.

Referring briefly to FIG. 1B, the event interface (127) of the calendar server (102) may facilitate the exchange of event records (128) between the calendar server (102) and the event management server (108). The event management server (108) may subscribe the creation of event records (128) by one or more specific users. As an option, when one of the users creates or modifies an event record (128) in the event repository (128), the event management server (108) may be notified of such a modification, thereby prompting the event management server (108) to retrieve the updated event record (128). As another option, when one of the users creates or modifies an event record (128) in the event repository (128), the modified event record (128) may be automatically forwarded or pushed to the event management server (108).

Referring again to FIG. 1C, each of the event records (148A-148N) may be associated with a single one of the accounts (146) of the financial management application (107). For example, a first event record (148A) may be stored in the event cache (132) on behalf of the first account (146A) of the financial management application (107), and a second event record (148B) may be stored in the event cache (132) on behalf of a second account (146N) of the financial management application (107). In this way, a single event management server (108) may temporarily hold pending event records (148) for numerous users or accounts of the financial management application (107).

In one or more embodiments, each of the event records (148) may include an account identifier that is used to identify the corresponding account (146) on the financial management application server. Examples of account identifiers include account numbers, email addresses, user names, business names, etc.

In one or more embodiments, the event records (148) of the event cache (132) are received at the event management server (108) from a calendar server (102) and/or a client device (104). For example, a given event record (148A) may be received from the calendar server (102) of FIG. 1B, in response to a user creating an event record (128A) on the calendar server (102) using the client device (104). The event record may have been created on the calendar server (102) by way of user input within the browser application (114). As another example, another event record (148B) may be received directly from the client device (104), in response to the user creating an event record within the calendar application (110) on the client device (104).

As described herein, the event records (128) stored within the event repository (126) may be substantially the same as the event records (148) stored within the event cache (132) of the event management server (108), and/or the event records (138, 139) stored within the billable event repository (145) of the financial management application (107). Thus, event records (128, 138, 139, 148) may move freely between the various systems of FIGS. 1A, 1B, and 1C for facilitating the automated billing practices described herein.

In one or more embodiments, the event tracker (152) includes any hardware and/or software operative to evaluate contents of the event records (148) in the event cache (132) to determine whether the associated events have completed. In other words, the event tracker (152) determines whether, for a given event record (148), a real-world event corresponding to that event record (148) is still pending. In one or more embodiments, the event tracker (152) may determine whether events have completed or are still pending by comparing the contents of the event records (148) in the event cache (132) to a current date and time. For example, if a first event record (148A) includes a date of Nov. 7, 2016, a start time of 2 PM, and an end time of 4 PM, then an event associated with the first event record (148A) may be determined complete on or after 4 PM on Nov. 7, 2016. Further, until the event is determined to have completed, then the first event record (148A) may remain pending in the event cache (132). As another example, if a second event record (148B) includes a date of Nov. 9, 2016, a start time of 3 PM, and a duration of 2 hours, then an event associated with the second event record (148B) may be determined complete on or after 5 PM on Nov. 9, 2016. Accordingly, the second event record (148B) may remain pending in the event cache (132) until the event tracker (152) determines that the event has completed.

In one or more embodiments, the event tracker (152) may continuously evaluate the contents of the event records (148) in the event cache (132) to identify completed events. In one or more embodiments, the event tracker (152) may periodically evaluate the contents of the event records (148) in the event cache (132) to identify completed events. For example, the event tracker (152) may evaluate the contents of the event cache (132) every 15 minutes, 30 minutes, 1 hour, 3 hours, 6 hours, etc. The event tracker (152) may store the event records (148) in a chronological ordering within the event cache (132) to facilitate the evaluation of pending events as having completed.

In one or more embodiments, for any event that has completed and is no longer pending, the event tracker (152) moves the corresponding event record (148) out of the event cache (132). More specifically, in response to identifying an event record (148) in the event cache (132) that is associated with a completed event, the event tracker (152) sends the identified event record (148) to the financial management application (107). For example, as illustrated in FIG. 1C, an event record (148A) has been moved from the event cache (132) to the billable event repository (145) of the financial management application (107) in response to a determination that the event tracked in the event record (148A) has completed. As a result, a new event record (138N) is created within the billable event repository (145), for use in generating an invoice, as described below. In this way, event records (148) may be used to create billable events within the financial management application (107) immediately after the corresponding events complete. Furthermore, various other event records (148B, 148C, 148D, etc.) remain pending in the event cache (132) because the associated events are still pending.

The event records (128, 138, 139, 148) may be moved between the various systems and servers as objects and/or files. The event records (128, 138, 139, 148) may be formatted in any suitable manner. For example, the event records (128, 138, 139, 148) may be exchanged as XML, ICS, VCS, CSV, JSON, etc. records. The event records (128, 138, 139, 148) may be transmitted using web-service calls (e.g., HTTP requests, etc.) to publically accessible interfaces of the systems and servers.

As used herein, the invoice generator (144) includes any hardware and/or software operative to create and/or send a statement of monies due for goods and/or services rendered. Such a statement may be an invoice, a bill, etc. Moreover, such a statement may be printed and sent by post, and/or communicated electronically, such as by email, etc.

In one or more embodiments, any event record (138, 139) stored within the billable event repository (145) comprises a record of an event that is fully billable. Accordingly, once goods and/or services have been rendered by one entity to another, the entity that received the goods and/or services may be billed.

As used herein, the billable event repository (145) may be any type of storage unit and/or device (e.g., a file system, database, collection of tables, etc.) for storing the event records (138, 139) in association with a respective account (146). For example, as shown in FIG. 1C, numerous event records (138A-138N) are shown stored in association with a first account (146A), and numerous other event records (139A-139N) are shown stored in association with a second account (146N). The billable event repository (145) may include multiple different storage units and/or devices. The multiple different storage units and/or devices may or may not be of the same type or located at the same physical site.

In one or more embodiments, the first account (146A) and the second account (146N) may be associated with the same business entity. For example, the first account (146A) may include event records (138) for billable events of a first sales associate of a given small business entity, and the second account (146N) may include event records (139) for billable events of a second sales associate of the same small business entity. In other words, the accounts (146) may be associated with different individuals or users of a single business entity that utilizes financial management application (107) hosted on the financial management application server (106). In such embodiments, a single user may be provided access to the event records (138, 139) of the two accounts (146A, 146N). In this way, the user may be able to generate an invoice, using the invoice generator (144) that includes billable events that originate from both the first account (146A) and the second account (146N).

In one or more embodiments, the first account (146A) and the second account (146N) may be associated with different business entities. For example, the first account (146A) may include event records (138) for billable events of a first business entity, and the second account (146N) may include event records (139) for billable events of a second business entity that is different than the first entity. In other words, the accounts (146) may be associated with different business entities that utilize the financial management application (107) hosted on the financial management application server (106).

For purposes of simplicity and clarity, the billable event repository (145) is shown to store event records (138, 139) for two accounts (146A, 146N). However, it is understood that the billable event repository (145) may store event records for any number of accounts (146). In other words, the billable event repository (145) may store event records for hundreds, thousands, etc. of accounts (146).

Figure 2A:
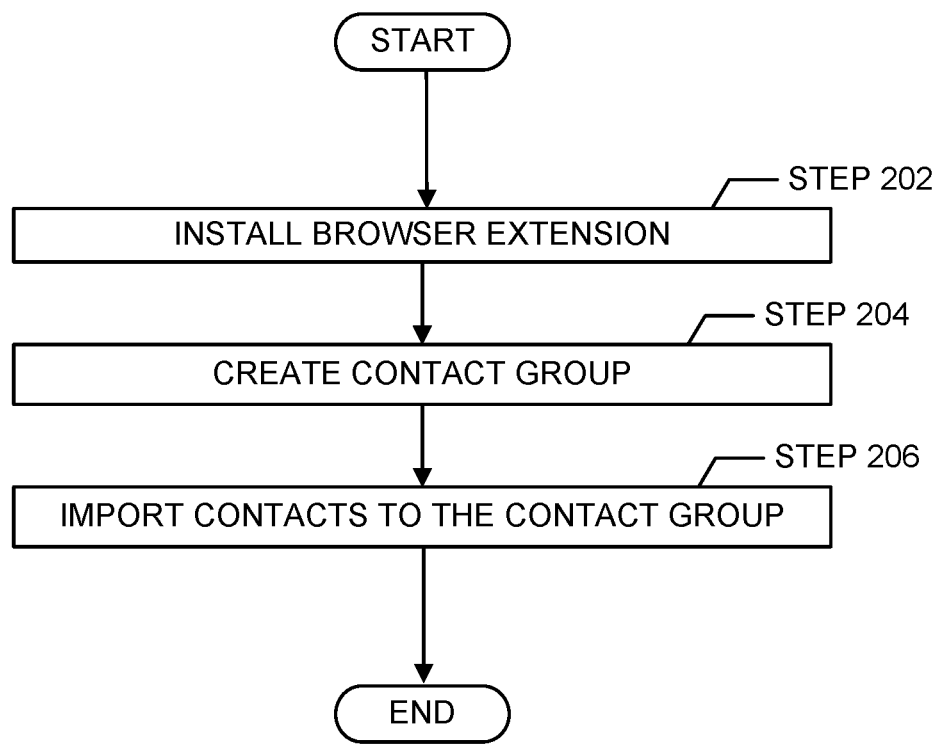
FIGS. 2A and 2B show methods performed in accordance with one or more embodiments of the invention.

FIG. 2A depicts a flowchart of a method (200) for the automated time tracking of events in a calendar, and for using the events to generate invoices, in accordance with one or more embodiments of the invention. In one or more embodiments, one or more of the steps shown in FIG. 2A may be omitted, repeated, and/or performed in a different order. Accordingly, embodiments of the invention should not be considered limited to the specific arrangements of steps shown in FIG. 2A. In one or more embodiments, the method (200) described in reference to FIG. 2A may be practiced using the calendar server (102) and/or the user device (104) of the system (100) of FIGS. 1A, 1B, and 1C, and/or the computing system (500) of FIG. 5A.

In one or more embodiments, the steps of the method (200) of FIG. 2A may be performed during an initial setup phase. In particular, at Step 202, a browser extension is installed. The browser extension may be installed at a user device, to extend the functionality of an already installed browser application of the device. In particular, once installed, the browser extension may monitor for user access of a web-based calendar, parse user input during such access to identify a control character within, and then display a contact list to the user, as described below, in the context of the method (250) of FIG. 2B. The browser extension may be downloaded and/or installed over a network.

Next, at Step 204, a contact group is created. In one or more embodiments, the contact group may be created at a local contact repository, or may be created on a remote server. The contact group may include any container, label, or other text common to two or more contact records.

Further, at Step 206, one or more contacts are imported to the contact group created at Step 204. In one or more embodiments, the contacts may be imported from a financial management application. For example, the contacts may be imported from a financial management application hosted on a financial management application server. In one or more embodiments, the importation of the contacts may include the transfer of contact information from the financial management application to a remote server, such as a calendar server.

Accordingly, each of the imported contacts may be a past, present, or future customer of the user. Still yet, the importation of the contacts may include the transfer of contact information stored locally on a user device to a remote server, such as a calendar server. Regardless of the original source of the contacts, contacts are imported at Step 206 to a contact group that is accessible from within a calendar of the user, thereby facilitating the subsequent billing of the contacts from the calendar.

In one or more embodiments, during the importation of the contacts at Step 206, each of the contacts being imported may be compared to contacts already stored at the destination. For example, if the contacts are being imported to a calendar server, then each of the contacts may be compared to contact records already stored at the calendar server. The comparison may be performed using any unique key or value. For example, the comparison may be performed by comparing the email address of each contact being imported with the contact records already stored to the calendar server. Whenever a match is found between an imported contact and an existing contact, the existing contact may be copied or moved to the contact group created at Step 204. In this way, the importation process may be augmented by pre-existing information at the destination.

After the browser extension is installed, and the contacts have been imported to the new contact group, the browser extension may leverage the new contact group for automated billing practices, described relative to FIG. 2B and FIG. 3, below.

Figure 2B:
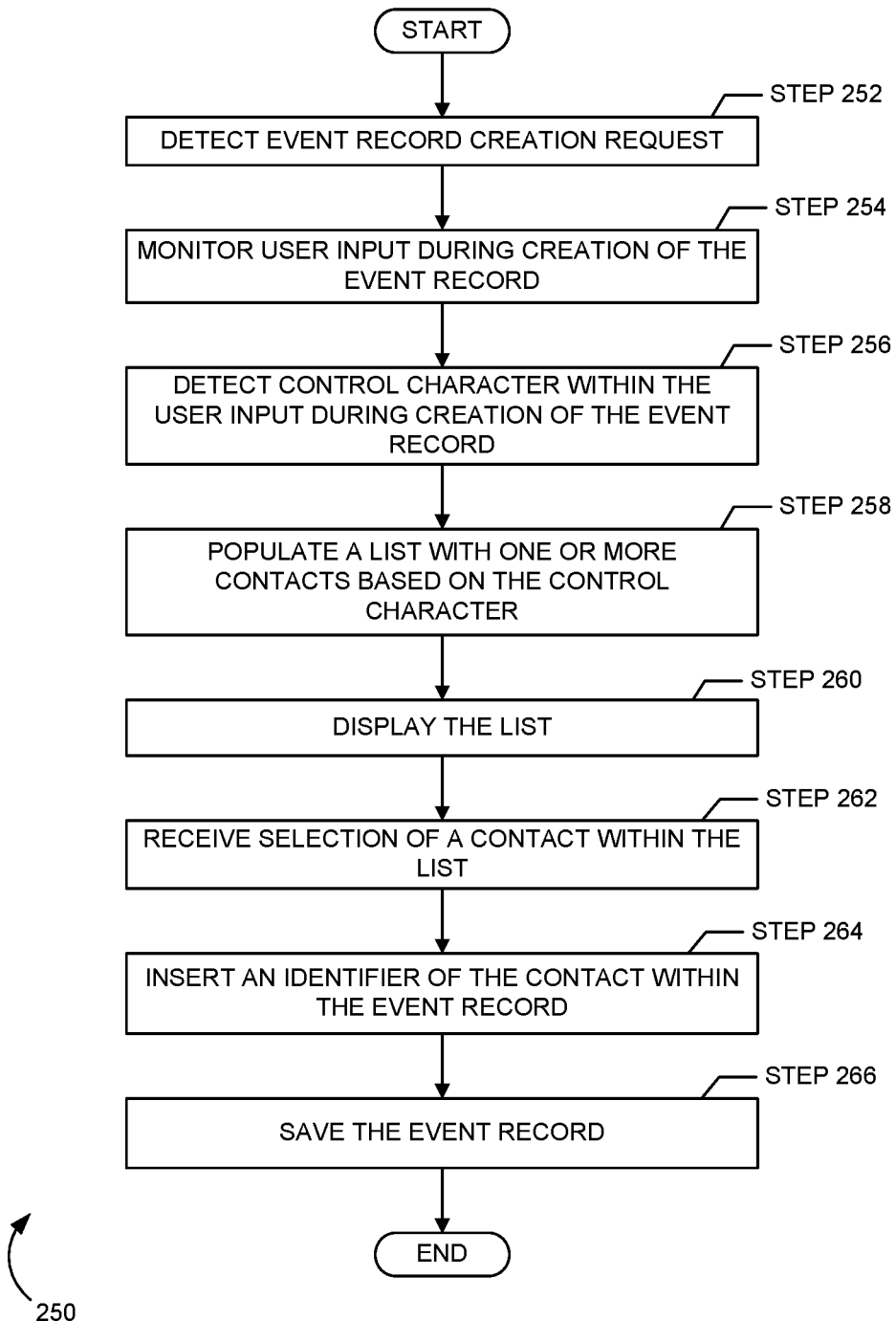

FIG. 2B depicts a flowchart of a method (250) for the automated time tracking of events in a calendar, and for using the events to generate invoices, in accordance with one or more embodiments of the invention. In one or more embodiments, one or more of the steps shown in FIG. 2B may be omitted, repeated, and/or performed in a different order. Accordingly, embodiments of the invention should not be considered limited to the specific arrangements of steps shown in FIG. 2B. In one or more embodiments, the method (250) described in reference to FIG. 2B may be practiced using the calendar server (102) and/or the user device (104) of the system (100) of FIGS. 1A, 1B, and 1C, and/or the computing system (500) of FIG. 5A. For example, in one or more embodiments, the method (250) described in reference to FIG. 2B may be practiced, at least in part, by a browser extension on a user device.

At Step 252, an event record creation request is detected. The event record creation request may include any request to create a calendared event. In one or more embodiments, the event record creation request may include the selection of a button within a calendar, such as a web-based calendar or a locally executing calendar application. For example, the event record creation request may occur within a browser application, and be directed to a calendar hosted on a calendar server. In one or more embodiments, the event record creation request may include a tap-and-drag or click-and-drag operation within a calendar. A tap-and-drag or click-and-drag operation may be used to define the starting and ending times of the event. For example, a user may click-and-drag from 1 PM to 2 PM on Nov. 23, 2016. Such user input may be detected as an event record creation request, from the user, for an event that will occur from 1-2 PM on Nov. 23, 2016.

Next, at Step 254, user input is monitored during the creation of the event record. In particular, the entry of event details by the user is monitored. Event details may include a date, a time, a place, etc. In one or more embodiments, any text entered by the user may be monitored and parsed. The parsing may include analyzing the text to identify one or more pre-defined control characters. For example, the text may be analyzed to identify a '+' character that has been pre-defined as a control character. Of course, any suitable character may be used as a control character. As noted above, the user input being monitored may include user input to a browser application.

Accordingly, at Step 256, the control character is detected within the user input during the creation of the event record. Moreover, at Step 258, and in response to identifying the control character, a list is populated with one or more contacts. The one or more contacts may originate from a single contact group. For example, the one or more contacts may originate from the contact group created at Step 204 and described in the context of the method (200) of FIG. 2A. In one or more embodiments, all contacts within the contact group may be populated in the list. As an option, if the user continues to enter text after the control character, the subsequently entered text may be used to filter the list of contacts. For example, if the user has entered "+A", then only contacts within the contact group that have a first name or last name starting with 'A' may be included in the list. In this way, the list may be automatically populated with customers of the user, and then effectively filtered, where such customers were previously extracted from a financial management application that the user relies on for managing his or her business.

Further, the list is displayed to the user at Step 260. In one or more embodiments, the list may include any combination of the names, phone numbers, email addresses, etc. of the contacts in the list. As an option, the list may include only the names of the contacts, in order to most efficiently display the customers of the user. In one or more embodiments, the list is displayed to the user overlaid on, or adjacent to, a calendar. The list may be displayed in-line with other details of the event that the user is creating a calendar record for. In this way, the user may be able to select from the list one or more individuals that should be billed for the user's time devoted to the event. For example, if the user is calendaring a meeting to revise blueprints from 9-11 AM on Dec. 1, 2016, the list may be displayed in-line with, or alongside of, the details of such a meeting (e.g., date, time, location, etc.).

Next, at Step 262, a selection of one of the contacts in the list is received from the user. The user may select the contact from the list using a mouse, touchscreen, keyboard, or any other feasible method. In response to the contact being selected from the list, an identifier of the contact is inserted within the event record being created by the user. For example, an email address, name, or other unique identifier of the contact may be inserted within the event record. In this way, the user may indicate that the contact should be billed for the calendared event.

In one or more embodiments, the user input may be further monitored to identify one or more additional pre-defined control characters. The one or more additional pre-defined control characters may include a currency symbol. Accordingly, the user input may be monitored to identify such a currency symbol, and a numerical value associated with the currency symbol. The numerical value may indicate a flat billed rate or an hourly billable rate. In response to identifying the currency symbol and the numerical value within the user input, additional information may be included within the event record. Specifically, a billable value may be included in the event record. The billable value may be utilized by a financial management application in determining how much the selected contact should be invoiced for the billable event. For example, the financial management application may determine, based on the additional user input, that a selected contact should be billed $200 for a single meeting, or billed $200/hour for a meeting that extended 3 hours.

In one or more embodiments, the identifier of the selected contact, the pre-defined control characters, and/or the billable value may be included in a subject line of the event. As a result, a user may create an event record that is dense with actionable data, without requiring that the user navigate through detailed event creation user interfaces. In other words, the contents of a subject line of an event record may include all information necessary for a financial management application to subsequently create a line item within an invoice.

Still yet, at Step 266, the event record saved. Saving the event record may include any operation that results in the recordation of a calendared event record within a calendar, whether local or remote. In one or more embodiments, the event record may be saved in response to user input confirming that the event record should be saved (e.g., a "Save" button), the user pressing a certain key, or clicking outside of a window or region containing the event details.

After the event record is saved, it is sent to an event management server. The event record may be sent to the event management server by a calendar server that hosts the calendar within which the event was created. The event record may be sent to the event management server by the user device that was used to create the event record.

In one or more embodiments, the event record may be fetched or retrieved by the event management server. In such embodiments, the event management server may be notified whenever an event record is created or modified. As an option, the event management server may only be notified when the record that was created or modified includes a control character and/or a contact identifier. In one or more embodiments, a created or modified event record may be automatically pushed to the event management server. In such embodiments, the event record may be sent to the event management server in response to a determination that the event record includes a control character and/or a contact identifier. In other words, an event record of the user may only be sent to the event management server when the event record includes a control character that indicates the event is billable and/or includes a contact that can be billed for the event.

Once the event record has been transmitted to the event management server, the event management server may monitor the status of the event, and manage any further forwarding of the event record to a system that includes functionality for billing for the event, such as a financial management application server.

Figure 3:
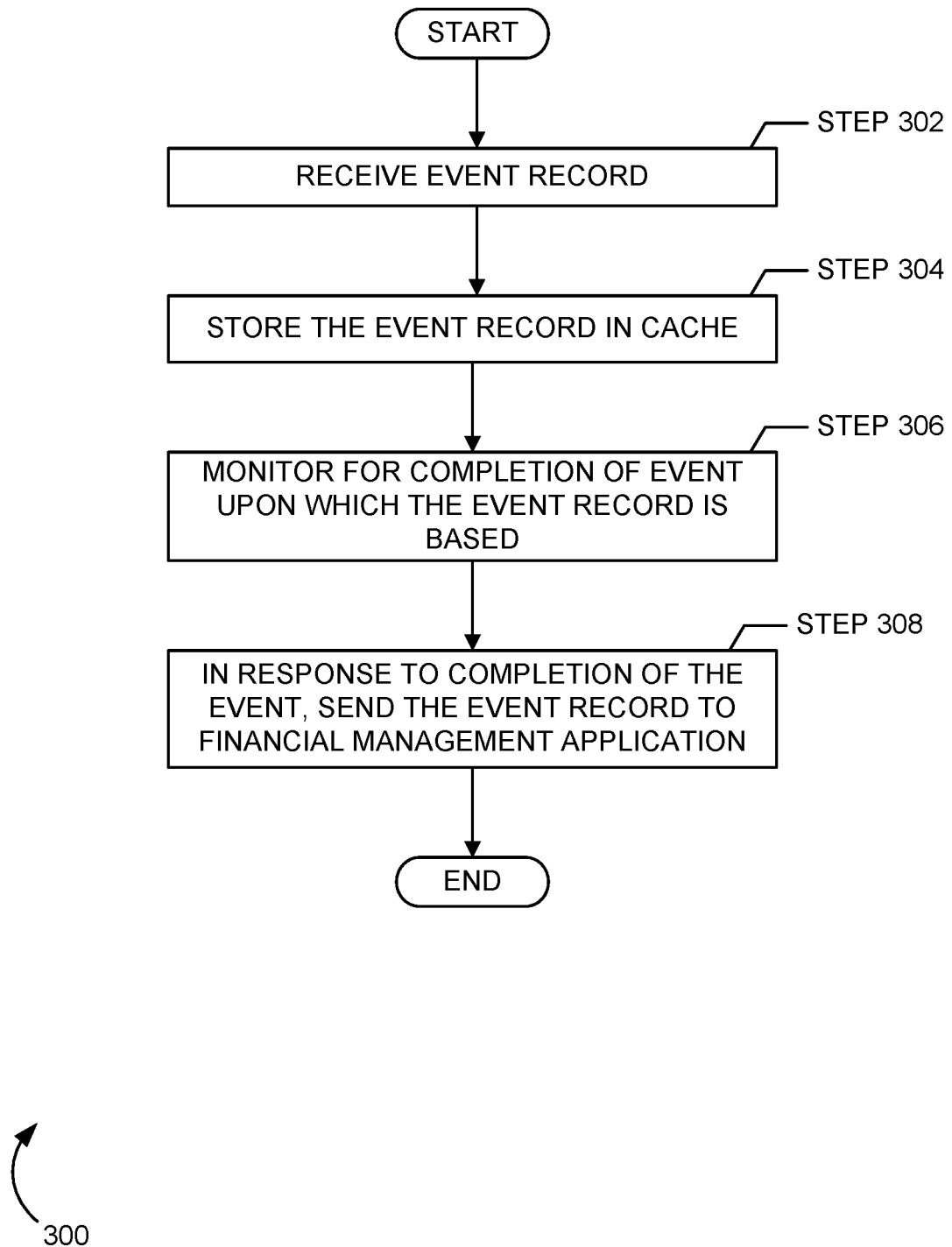
FIG. 3 shows a method performed in accordance with one or more embodiments of the invention.

FIG. 3 depicts a flowchart of a method (300) for the automated time tracking of events in a calendar, and for using the events to generate invoices, in accordance with one or more embodiments of the invention. In one or more embodiments, one or more of the steps shown in FIG. 3 may be omitted, repeated, and/or performed in a different order. Accordingly, embodiments of the invention should not be considered limited to the specific arrangements of steps shown in FIG. 3. In one or more embodiments, the method (300) described in reference to FIG. 3 may be practiced using the event management server (108) of the system (100) of FIGS. 1A, 1B, and 1C, and/or the computing system (500) of FIG. 5A.

An event record is received at Step 302. As noted above, the event record may include a date, a start time, an end time or duration, a contact identifier, and/or a billable value. Further, the event record may identify a user or account from which the event record originated. In other words, the event record may identify the user or account that created the event record. In one or more embodiments, the event record may be received from a calendar server or a user device. As an option, the event record may be retrieved from the calendar server or the user device.

Once the event record is received, the event record is stored in an event cache at Step 304. Such storage may be temporary, thereby reducing the long-term storage requirements of the event cache. For example, once it is determined that an event has completed, the corresponding event record may be removed from the event cache. Accordingly, the event cache may be monitored by an event tracker to identify the completion of events, and to facilitate that efficient removal of event records associated with events that are no longer pending.

At Step 306, the event, upon which the event record is based, is monitored for completion. Monitoring may include comparing an end time of the event with a current date and time, or comparing a start time of the event and duration of the event with the current date and time. The event record may be used for such monitoring and comparison. As a result, once it is determined that the end of the event has passed, it may be determined that the event is completed. Of course, the event may be monitored for completion in any feasible manner.

At Step 308, in response to the completion of the event, the event record is sent to a financial management application. In one or more embodiments, the financial management application may be configured to enable billing of any received event record. Further, as noted above, the event record may include the identifier of a contact that should be billed for the time associated with the event, as well as a user or account from which the event record originated. Also, the event record may include a billable amount or billable rate that the contact is expected to pay.

Accordingly, once the event has passed and the event record is transmitted to a financial management application, the financial management application may be in receipt of all information necessary to generate an invoice. In other words, upon receipt of the billable record, the financial management application will be made aware of: the date and time of billable activity, the user that performed the billable activity, the rate or value of the billable activity, and/or the customer that should be invoiced for the billable activity. In this manner, a user may efficiently bill a customer by simply including contact information of the customer within events that the user has calendared. Functionality may be provided by way of, for example, a browser extension, that facilitates the rapid selection and insertion of a particular customer's contact information, from within a list of customers, based on input from the user during an event creation process. Because the user may already rely on his or her calendar for organizing his or her daily activities, the user does not need to subsequently re-enter that time into a separate billing tool.

Figure 4A:
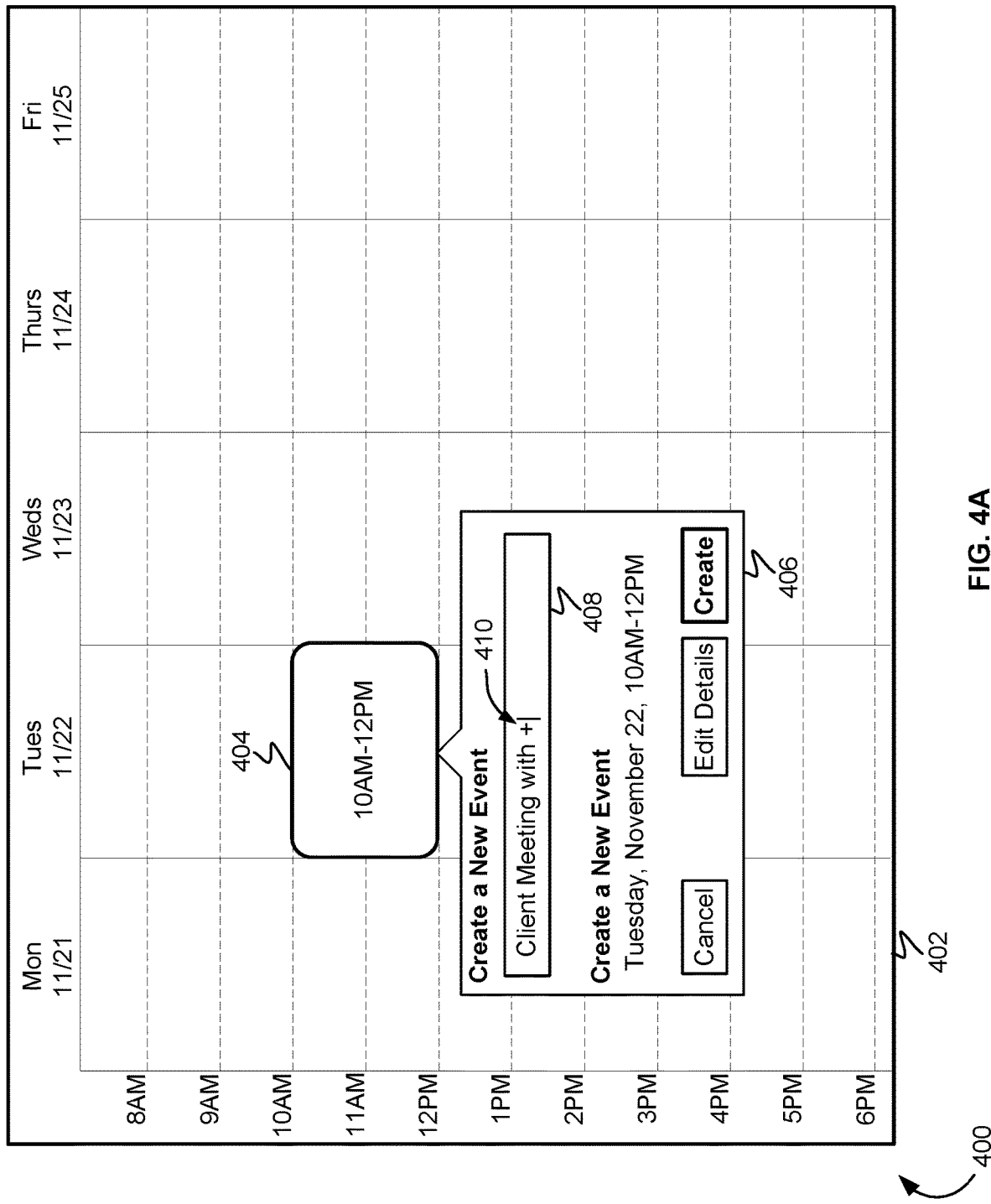
Figure 4B:
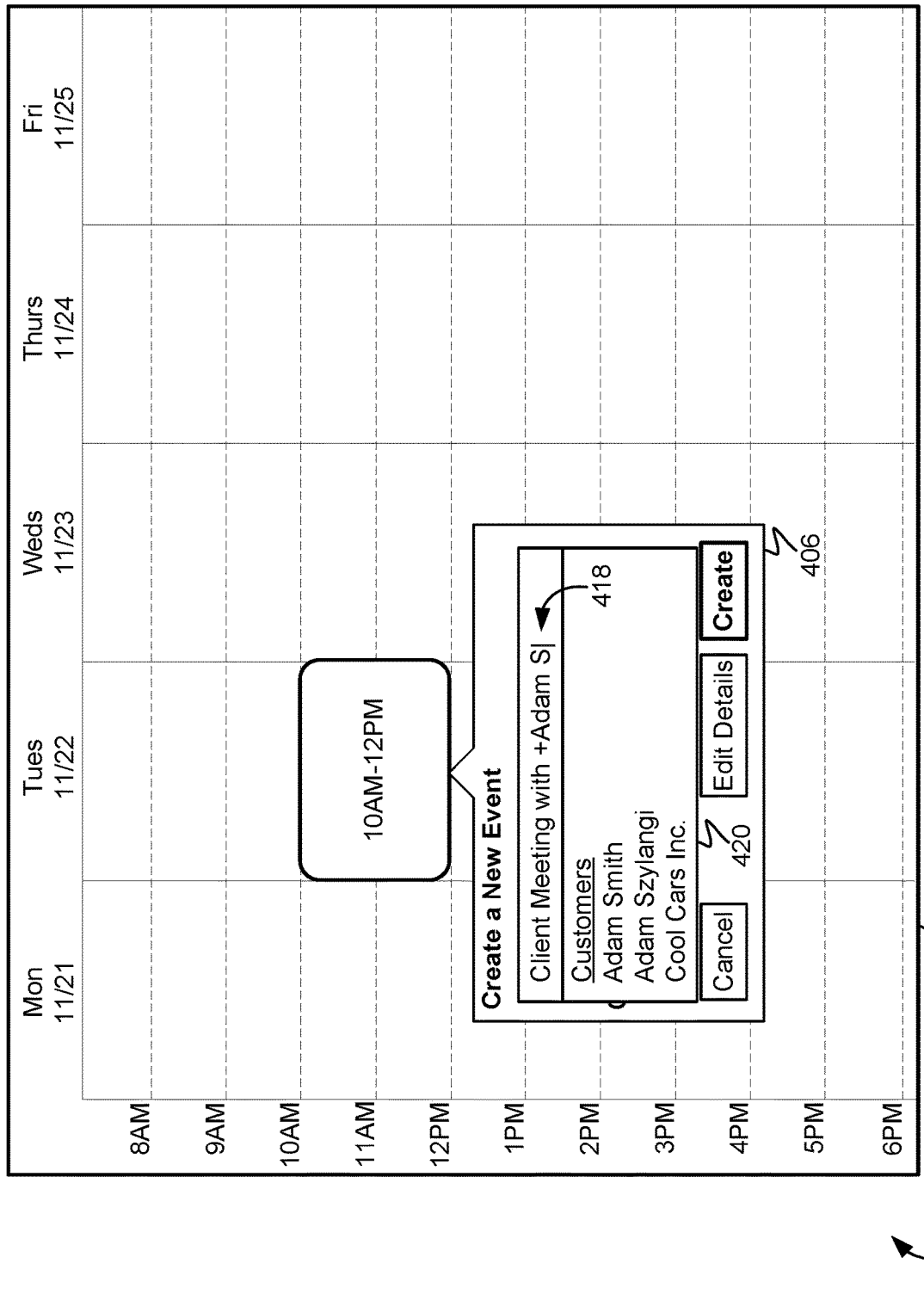

FIGS. 4A, 4B, and 4C, show an example of automated time tracking of events in a calendar, and use of the same to generate invoices, in accordance with one or more embodiments of the invention. The example of FIGS. 4A, 4B, and 4C may be a specific implementation of the system (100) described in the context of FIGS. 1A, 1B, 1C, and 1D. The example of FIGS. 4A, 4B, and 4C may be implemented using the computing system (500) of FIG. 5A. The example of FIGS. 4A, 4B, and 4C may be carried out according to the methods (200, 250, 300) described with respect to FIGS. 2A, 2B, and 3, above Referring now to FIG. 4A, a user interface (402) of a calendar (400) is shown. The user interface (402) may be displayed within a browser application that executes locally on a user device. In other words, the calendar (400) may be hosted remotely, by a calendar server. The calendar (400) is shown to depict the work week of November 21-25 of a given user. Further, the user has attempted to create an event (404) within the calendar (400). Specifically, the user has created the event (404) that will span from 10 AM-12 PM on Tuesday, November 22. The creation of the event (404) may be initiated by an event creation request from the user. For example the user may select a "Create New Event" button (not shown), or the user may click and drag, from 10 AM-12 PM on November 22 within the calendar (400).

In response to the new event creation request, the user interface (402) displays an event detail window (406). The event detail window allows the user to provide additional details regarding the new event (404). In particular, the event detail window (406) includes a text field (408). Within the text field (408), the user may enter relevant information such as a location for the event, a purpose of the event, a conference number for the event, etc.

Within the text field (408), the user has entered the control character '+' (410). An extension to the user's browser has been monitoring the user's input to the calendar (400). As an option, the extension may have started monitoring the user's input in response to the event creation request from the user, and/or based on the user's access to the remote calendar (400). The extension to the user's browser has identified the control character '+' (410) within the user input. Accordingly, in response to identifying the control character '+' (410), the browser extension has retrieved a list of customer contacts of the user from a predetermined contact group. The contact group may include all of the customers of the user.

Referring now to FIG. 4B, contacts of a contact group labeled "Customers" are shown to the user within the event detail window (406). In particular, the customers named "Adam Smith," "Adam Szylangi," and a business named "Cool Cars Inc." are displayed within a list (420). In one or more embodiments, the customers displayed in the list may be filtered based on additional user input. For example, after entering the control character '+' (410) within the text field (408), the user continued to enter additional text "Adam S" (418). As a result, the names of customers displayed within the list (420) are filtered based on the additional text "Adam S" (418). It is understood that contacts may be filtered based on fields other than the first and/or last name of a person. For example, Cool Cars Inc. may be owned by an individual named "Adam Skdadam," and the filtering of contacts to generate the list (420) relies on such information, which is not displayed.

Upon seeing the list (420) of FIG. 4B, the user selects the name "Adam Szylangi," and selects the "Create" button. As a result, an event record is generated for an event occurring on Nov. 22, 2016, from 10 AM-12 PM. The event record includes "+Adam Szylangi." Once the event record is created, the event record may be copied to an event management server that operates to identify the completion of the event. For example, the event management server may be configured to identify, on or after 12 PM on Nov. 22, 2016, that the event has completed.

FIG. 4C depicts a user interface (452) of a financial management application (450). The financial management application (450) maybe hosted remote from a user, on a financial management application server. After the completion of the event of November 22 (created in FIGS. 4A and 4B), the user would like to bill his customer, Adam Szylangi, for the two-hour period of time. Accordingly, the user accesses the financial management application (450) used to invoice customers for goods and/or services. From a menu (460), the user selects the specific customer "Adam Szylangi." In response to the user's selection, various details regarding Adam may be populated into an invoice. For example, Adam's email address, billing address, and invoice terms may be populated into the invoice.

Furthermore, the user is presented with two billable time entries based on his or her selection of "Adam Szylangi" from the menu (460). In particular, the user is presented with a first billable time entry (464) and a second billable time entry (466). As shown in FIG. 4C, the first billable time entry (464) includes all of the relevant details of the event record described in the context of FIGS. 4A and 4B. In particular, the first billable time entry (464) describes a 2 hour billable event on Nov. 22, 2016, and includes the description "Client Meeting with +Adam Szylangi," as entered by the user within his or her calendar. By clicking the associated "Add to Invoice" control, the billable time entry (464) may be added to the invoice. In this way, an invoice may be rapidly created that accurately reflects time tracked on an external calendaring system.

The second billable time entry (466) may originate from within an independent time-keeping tool, or from another calendar entry. It may also be added to the invoice by clicking the associated "Add to Invoice" control. The user interface (452) also includes a control (468) labeled "Add All" which may be used to add all displayed billable time entries to the invoice. In this way, all of a user's billable time may be automatically extracted from his or her calendar, without cumbersome and tedious manual entry after the fact. Moreover, the user may feel confident that all of his or her billable time has been automatically identified and extracted from the external calendaring system.

Figure 5A:
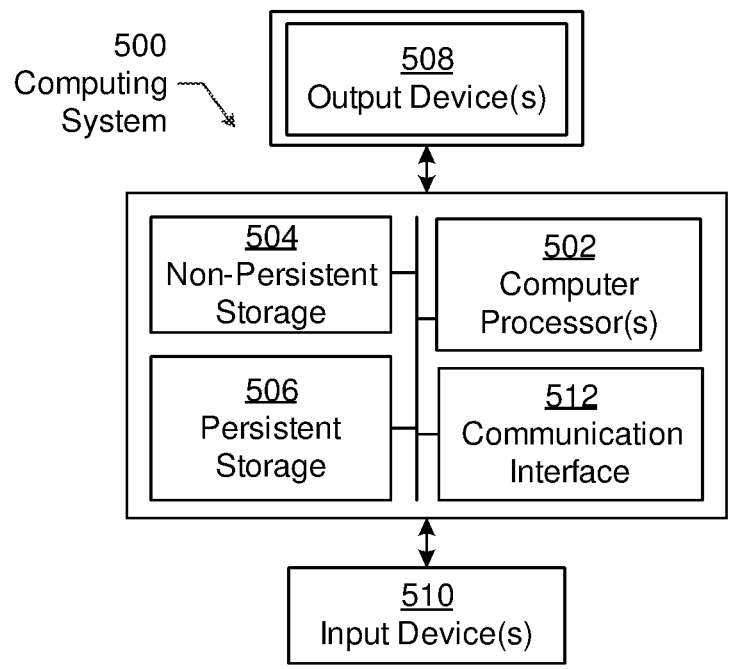
FIG. 5A shows a computing system, in accordance with one or more embodiments of the invention.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
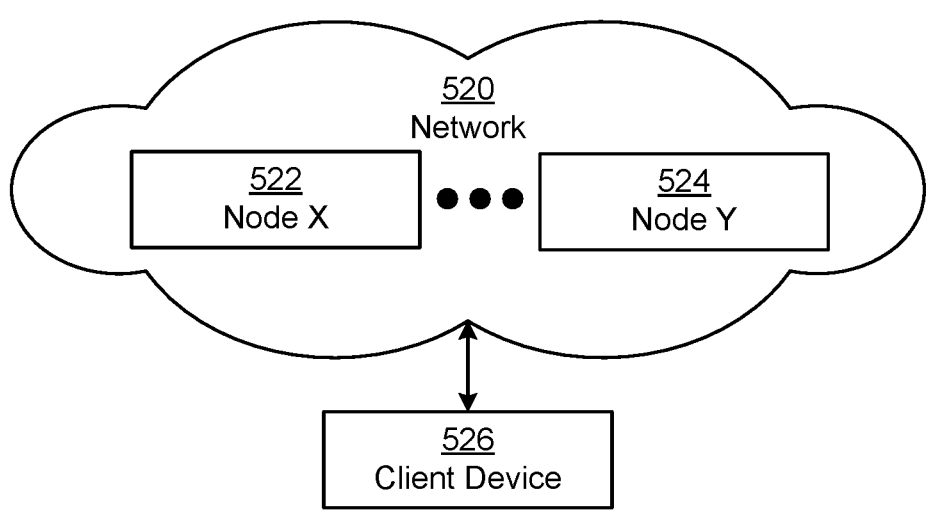
FIG. 5B shows a group of computing systems, in accordance with one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   detecting, at a calendar server, an event record creation request received from a user using a calendar program managed by the calendar server, wherein:
      detecting is performed by a browser extension interfacing with a browser application displaying the calendar program,
      the browser extension provides non-native functionality to the calendar program at least by providing a first control character comprising a symbol for use in the calendar program, and
      the event record creation request is for an event for which the user records billable time;
   monitoring, based on the event record creation request, user input including event details for an event record, the user input received by the calendar program;
   while monitoring the user input, identifying the first control character within the user input;
   populating, by the calendar server, in response to identifying the first control character, a list comprising one or more contacts from a contact group of the user, wherein the contact group is retrieved by the browser extension at least from the calendar program via a communications application programming interface (API) programmed in the browser extension;
   displaying, to the user in a user interface generated by the calendar program, the list of the one or more contacts;
   receiving, via the user interface, a selection of a contact from within the list;
   based on the selection, via the communications API, insert an identifier of the contact within the event record for the calendar program; and
   transmit the event record with the identifier of the contact via the communications API to an event management server configured to:
      receive the event record with the identifier of the contact from the browser extension, wherein the event record also includes an end time, store the event record in an event cache,
monitor for event completion based on the end time of the event record, and
in response to identifying the event completion, forward automatically, after completion of the event, the event record to a financial management application (FMA) server to create the billing entry in the FMA for the contact identified by the contact identifier, wherein the FMA is remote from the browser extension and the calendar program.

2. The method of claim 1, further comprising:
while monitoring the user input, identifying a second control character within the user input.

3. The method of claim 2, further comprising:
inserting, based on the second control character, a billable value within the event record.

4. The method of claim 2, wherein the second control character includes a currency symbol.

5. The method of claim 1, wherein the control character includes a plus ('+') sign.

6. The method of claim 1, further comprising, prior to detecting the event record creation request:
creating the contact group;
retrieving the one or more contacts from a financial management application used by the user; and
importing the one or more contacts from the financial management application to the contact group.

7. A system, comprising:
a computer processor;
a browser extension interfacing with a browser application comprising a calendar program executing on the computer processor, the browser extension configured to provide additional, non-native functionality to the calendar program by being configured to:
provide a first control character comprising a symbol, wherein the browser extension provides the first control character for use in the calendar program;
detect, at the calendar program executed by the computer processor, an event record creation request received from a user using the calendar program, wherein the event record creation request is for an event for which the user records billable time;
monitor, based on the event record creation request, user input including event details for an event record, the user input received by the calendar program;
while monitoring the user input, identify the first control character within the user input;
populate, in response to identifying the first control character, a list comprising one or more contacts from a contact group of the user, wherein the contact group is retrieved by the browser extension at least from the calendar program via a communications application programming interface (API) programmed in the browser extension;
display, to the user in a user interface generated by the calendar program, the list of the one or more contacts;
receive, via the user interface, a selection of a contact from within the list;
based on the selection, via the communications API, insert an identifier of the contact within the event record for the calendar program; and
transmit the event record with the identifier of the contact via the communications API to an event management server; and
the event management server, wherein the event management server is configured to:
receive the event record with the identifier of the contact from the browser extension, wherein the event record also includes an end time,
store the event record in an event cache,
monitor for event completion based on the end time of the event record, and
in response to identifying the event completion, forward automatically, after completion of the event, the event record to a financial management application (FMA) server to create the billing entry in the FMA for the contact identified by the contact identifier, wherein the FMA is remote from the browser extension and the calendar program.

8. The system of claim 7, wherein the browser extension is configured to, while monitoring the user input, identify a second control character within the user input.

9. The system of claim 8, wherein the browser extension is configured to, insert, based on the second control character, a billable value within the event record.

10. The system of claim 7, wherein the browser extension is configured to filter the list based on additional user input.

11. The system of claim 7, wherein the list includes names of the one or more contacts from the contact group.

12. The system of claim 7, further comprising the financial management application, wherein the financial management application is configured to generate an invoice using the event record.

13. The method of claim 1, wherein forwarding comprises:
forwarding the event record to an event management server; and
thereafter transmitting the event record from the event management server to the financial management application server.

* * * * *